No. 774,047. PATENTED NOV. 1, 1904.
W. H. DAVIS & J. M. WOOD.
AUTOMATIC CAGE LOADER.
APPLICATION FILED APR. 18, 1904.
NO MODEL. 2 SHEETS—SHEET 2.
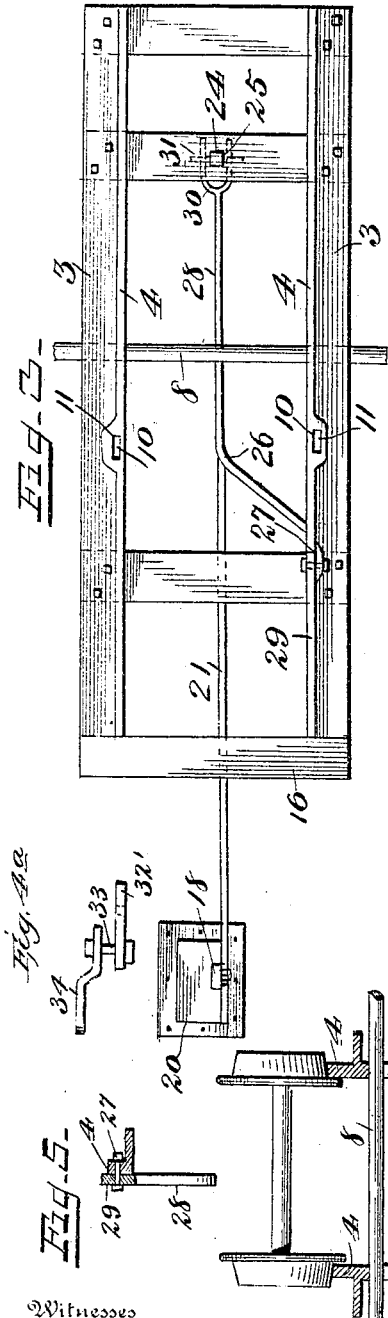
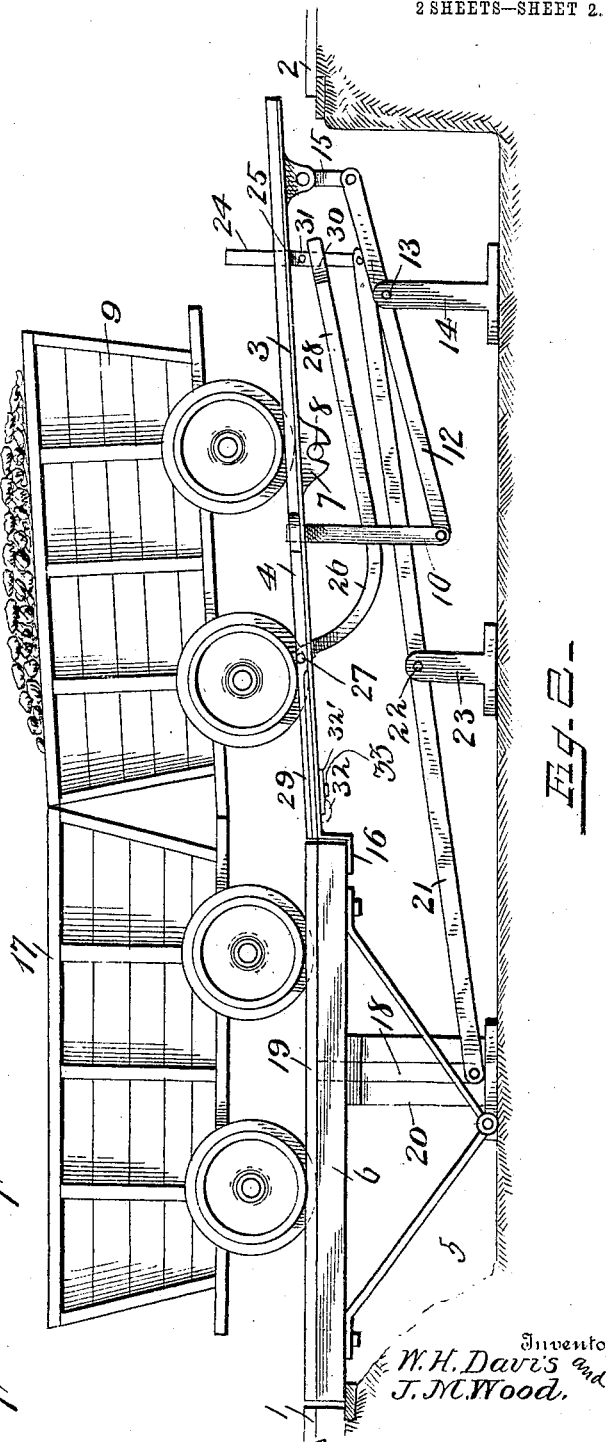
Witnesses
F. L. Ourand
L. O. Hilton
Inventors
W. H. Davis and
J. M. Wood.
By H. B. Willson
Attorney No. 774,047.

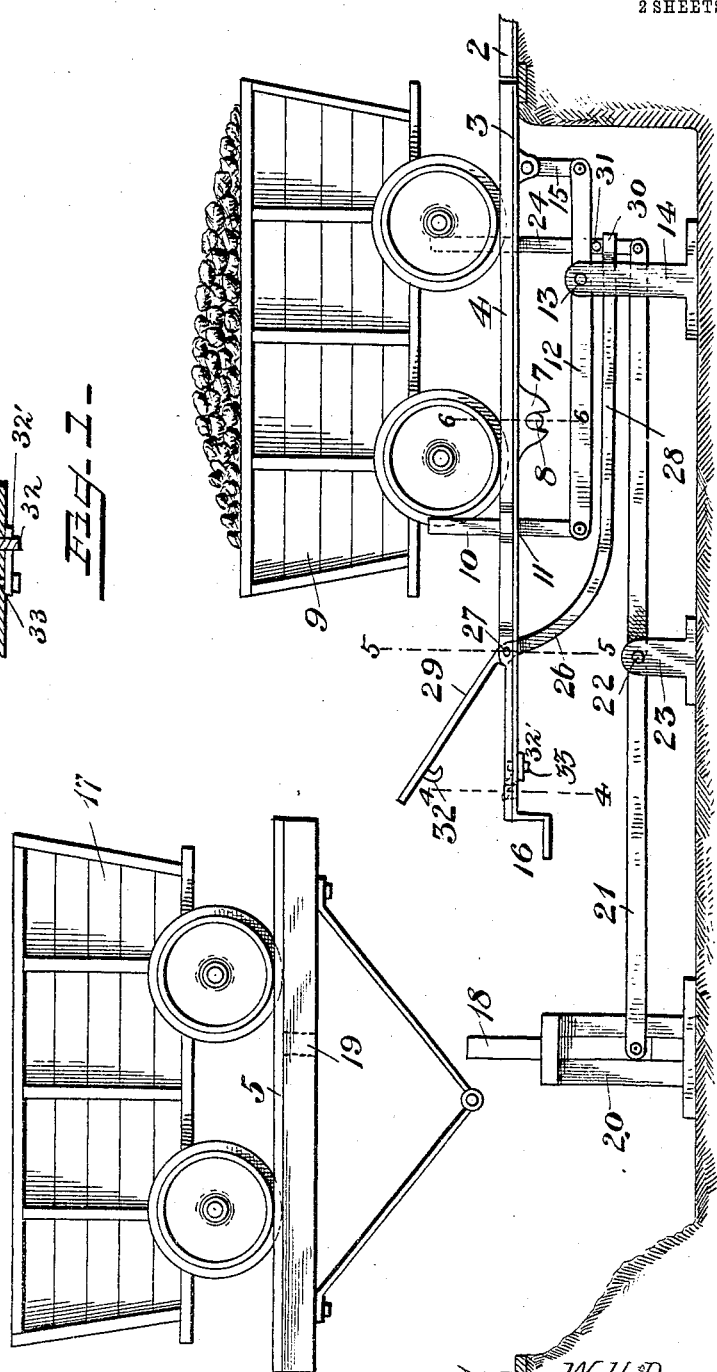

Patented November 1, 1904.

UNITED STATES PATENT OFFICE.

WILLIAM H. DAVIS AND JOSEPH M. WOOD, OF CAMBRIDGE, OHIO.

AUTOMATIC CAGE-LOADER.

SPECIFICATION forming part of Letters Patent No. 774,047, dated November 1, 1904.

Application filed April 18, 1904. Serial No. 203,781. (No model.)

*To all whom it may concern:*

Be it known that we, WILLIAM H. DAVIS and JOSEPH M. WOOD, citizens of the United States, residing at Cambridge, in the county of Guernsey and State of Ohio, have invented certain new and useful Improvements in Automatic Cage-Loaders; and we do declare the following to be a full, clear, and exact description of the invention, such as will enable others skilled in the art to which it appertains to make and use the same.

This invention relates to means for automatically loading the shaft cages or elevators of coal or other mines with coal or ore to be carried to the surface, and particularly to means for automatically displacing empty cars from the cage and running loaded cars thereon; and one object of the invention is to provide automatic mechanism of this character which will be operated by the cage itself on its descent to release a loaded car and cause the same to run by gravity thereon and push off the car previously carried to the surface and unloaded or a car loaded with supplies brought from the surface for use in the mine, thereby doing away with hand labor or extra power appliances.

Another object of the invention is to provide effective means for locking and releasing the cars and for preventing a loaded car from running onto the cage when the car upon the cage is to be retransported to the surface for lowering supplies from the surface into the mine.

With these and other objects in view the invention consists of certain novel features of construction, combination, and arrangement of parts, as will be more fully described, and particularly pointed out in the appended claims.

In the accompanying drawings, Figure 1 is a side elevation showing the normal positions of the parts, the cage being represented as nearing the limit of its descent and bearing an empty car which has been unloaded at the surface. Fig. 2 is a similar view showing the movable track-section tilted to form an inclined plane and the loaded car thereon about to run upon the cage. Fig. 3 is a top plan view of the cage and tilting track-section. Figs. 4, 5, and 6 are transverse sections taken through the tilting track-section on the lines 4 4, 5 5, and 6 6 of Fig. 1.

1 and 2 represent the terminal portions of the mine-car trackway adjacent to the shaft; 3, a movable track-section or platform carrying rails 4, which are adapted to aline with the rails of the terminal portion 2, and 5 a cage or elevator which is here conventionally shown and which carries track-rails 6. The hoisting mechanism of the cage has been omitted as unnecessary to the disclosure.

The movable track-section or platform 3 is provided with bearings 7 to turn upon a shaft or axle 8 and is properly balanced to normally assume a horizontal position, so that its rails 4 will aline with the rails of the track-terminal 2 and allow said cars to pass from said terminal 2 onto the said movable track-section or platform 3.

In the drawings we have shown a loaded car 9 arranged in position upon the platform 4 to pass from the same onto the cage 5 when the latter reaches its lower position. This car 9 is held from movement by a stop-bar 10, arranged to slide vertically in a slot 11 in the platform 3 and to engage one of the forward wheels of the car, thus holding the latter from forward movement. The bar 10 is jointed at its lower end to the long arm of a stop-actuating lever 12, which is pivoted at 13 to a suitable supporting block or bracket 14 and has its shorter arm movably connected by a link 15 to the platform 3. The construction and arrangement of these parts is such that when the platform 3 is in a horizontal position the stop-arm 10 will be projected upwardly to the limit of its movement; but when the platform 3 is tilted to the position shown in Fig. 2 the long arm of the lever 12 will be shifted through the changing position of the link 15 to pull the stop-arm 10 downward and out of the path of the wheel of the car 9, thus allowing the latter to run down the inclined plane formed by the platform 3 onto the rails of the cage 5. The cage 5 in its descent is adapted to engage projections 16 on the adjoined end of the platform 3 and to tilt the latter downward to the position shown in Fig. 2. In the drawings we have represented the cage as bearing a car 17, which has been hoisted to the surface for the discharge of its contents and has been brought down into the mine again for reloading. When the cage reaches the limit of its downward movement, this car 17 is held stationary by means of a stop-bar 18, which is adapted to project upwardly through an opening 19 in the platform of the cage and to engage one of the axles of said car. The stop 18 moves vertically in a guide block or bracket 20 and is jointed at its lower end to one arm of a stop-actuating lever 21, pivoted at 22 to a suitable block or support 23 and connected at the end of its opposite arm to a stop 24, adapted to be projected upwardly through a slot 25 in the tilting track-section or platform 3. When the stop 18 is in its normal position, the stop 24 lies wholly beneath the platform 3; but when the stop 18 is depressed by the tilting of the lever 21 the stop 24 is projected upwardly to lie in a position in advance of the position normally occupied by the rear axle of the car 9.

A trip-lever 26 is pivotally connected, as at 27, to the platform 3 and has a horizontal arm 28 and a trip-arm 29. The arm 28 is provided at its rear end with a fork 30 to engage a pin 31 on the stop-bar 24, while the arm 29 normally lies in an inclined position and above the said platform 3 and when depressed by a wheel of the car as the latter moves down the inclined plane, formed by the platform, lies in a recess on the upper side of one of the rails 4 at its lower outer end to permit the passage of the said car-wheel over said rail and said arm 29. The outer or forward end of the trip-arm 29 is provided with a depending hook 32, which when the arm falls down projects beneath the platform and is adapted to be engaged by a catch 32', consisting of a bar or plate rigidly mounted upon a pivot-bolt 33 and having an actuating-handle 34, by means of which it may be swung into and out of engagement with the hook.

Fig. 1 of the drawings shows the normal position of the parts when the car 9 is on the platform and held from movement by the stop-arm 10 and the cage 5 is nearing the limit of its downward movement. The end of the cage 5 engages the projection 16 just before coming to a stop and as it reaches its final movement tilts the platform 3 to an inclined position. At this moment the stop 18 moves up through the slot 19 in the cage and engages the rear axle of the empty car 17 and holds it from movement. The downward tilting of the platform 3 at this juncture causes the lever 12 to be shifted to the position shown in Fig. 2, whereby the arm 10 is moved downward out of the path of the car-wheel; and the latter begins to roll down the platform 3 and as it continues to move depresses the trip-arm 29, thus tilting the arm 28 of the lever 26 upwardly, whereby the fork 30 is caused to engage the pin 31 and to project the stop 24 upwardly and at the same time to tilt the lever 21 to depress the stop 18, thus leaving the car 17 free to move from the cage 5. The car 9 thereupon passes from the platform 3 onto the cage 5 and pushes the car 17 from the cage to the track-terminal 1. When the car 9 passes off the platform 3, the latter tilts back to its normal horizontal position, again projecting the stop 10 and drop-arm 29 upwardly and also projecting the stop 18 up through the slot 19 of the cage 5 to hold the car 9 thereon from movement. The cage may then be elevated to surface to discharge the contents of car 9, and when the same is lowered this car in turn is pushed off the cage by the following loaded car passed from the platform 3, as will be readily understood.

When the car 17 on the cage is to be raised and lowered a number of times for transporting supplies for the mine from the surface, it is of course necessary to prevent the loaded car on the platform 3, waiting its turn to be elevated, from running off said platform onto the cage when the platform is tilted by the cage on the latter reaching the bottom of the shaft. This may be accomplished by manually depressing the trip-arm 29 and bringing the catch 32' into engagement with the hook 32. This will project the stop 24 upwardly to lie in the path of the rear axle of the car on the platform 3, which will prevent the car from passing off the platform, although the stop-arm 10 will be lowered when the platform is tilted by the cage.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus fully described our invention, what we claim as new, and desire to secure by Letters Patent, is—

1. In an apparatus for loading mine cages or elevators, the combination of a trackway, a cage, a tilting track-section between one portion of the track-rail and the cage, means for holding the car on said track-section against movement, means whereby the track-section will be tilted when the cage descends, and means for releasing the car on the platform to allow the same to travel down the inclined plane formed by the tilted platform and onto the cage, substantially as described.

2. In an apparatus for loading mine cages or elevators, the combination of a trackway, a cage, a tilting track-section between one portion of the trackway and the base of the shaft in which the cage descends, said track-section having a portion adapted to be engaged by the cage to tilt it as the cage reaches the limit of its downward movement, a stop device for holding a car against movement on the loaded platform, said stop device being automatically retracted when the track-section is tilted, and a second stop device adapted to be thrown into action to prevent the car from passing from the tilted platform onto the lower cage.

3. In an apparatus for loading mine cars or elevators, the combination of a trackway, a cage, tilting track-section disposed between one portion of the trackway, and the base of the shaft in which the cage descends, stop devices for respectively holding the cars on the cage and platform against movement, means for automatically retracting the stop device on the platform when the latter is tilted and a trip device adapted to be operated by the car traveling down the tilted platform to retract the stop device holding the car on the cage, substantially as described.

4. In an apparatus for loading mine cages or elevators, the combination of a trackway, a cage, a tilting platform between one portion of the trackway and the base of the shaft in which the cage descends, said platform having a portion adapted to be engaged by the cage and effect the tilting thereof, stop devices to engage the cars of the cage and platform to hold the same from movement, means for automatically retracting the stop device of the platform when the latter is tilted, a lever connected to the stop device of the cage, a third stop device, and a lever having a trip member adapted to be operated by the car to retract the stop device of the cage and adapted to be manually adjusted to project the third stop device to prevent movement of the car on the tilted platform when the first-named stop device thereof is retracted, substantially as described.

5. In an apparatus for loading mine cages or elevators, the combination of a trackway, a cage, a tilting platform between one portion of the trackway and the base of the shaft in which the cage descends, said platform having a portion to be engaged by the cage to tilt it when the cage reaches the limit of its downward movement, a stop device for engaging a car on the platform to hold the car from movement, a pivoted lever connected to said stop device and to the platform to automatically retract said stop device when the platform is tilted, a second stop device adapted to be projected into the path of the car and hold the same from movement when the platform is tilted, a third stop device to hold a car from movement on the cage, a lever connecting the said second and third stop device, and the trip-lever connected to the second stop device and adapted to be operated by the car to retract the said third stop device and to be manually adjusted to project the stop device to arrest the movement of the car on the tilting platform when the first-named stop device thereof is retracted.

In testimony whereof we have hereunto set our hands in presence of two subscribing witnesses.

WILLIAM H. DAVIS.
JOSEPH M. WOOD.

Witnesses:
  GEO. D. DUGAN,
  RICHARD MINTO.